(12) United States Patent
Lylykangas et al.

(10) Patent No.: US 8,110,018 B2
(45) Date of Patent: Feb. 7, 2012

(54) AMMONIUM NITRATE GRANULE AND METHOD FOR THE PREPARATION OF THE SAME

(75) Inventors: Mikko Lylykangas, Helsinki (FI); Harri Kiiski, Espoo (FI); Juhani Poukari, Masala (FI); Robert John Milborne, Cheshire (GB)

(73) Assignee: Kemira Growhow Oyj, Helsinki (FI)

( * ) Notice: Subject to any disclaimer, the term of this patent is extended or adjusted under 35 U.S.C. 154(b) by 823 days.

(21) Appl. No.: 11/884,879

(22) PCT Filed: Feb. 24, 2006

(86) PCT No.: PCT/FI2006/000073
§ 371 (c)(1),
(2), (4) Date: Jan. 14, 2008

(87) PCT Pub. No.: WO2006/090007
PCT Pub. Date: Aug. 31, 2006

(65) Prior Publication Data
US 2008/0098781 A1    May 1, 2008

(30) Foreign Application Priority Data
Feb. 25, 2005  (FI) .................................... 20050224

(51) Int. Cl.
*C05C 1/02* (2006.01)
*C05C 1/00* (2006.01)
*C05C 3/00* (2006.01)
*C05D 9/02* (2006.01)
*A01N 25/00* (2006.01)

(52) U.S. Cl. ........ 71/61; 71/59; 71/60; 71/63; 71/64.02; 71/64.07

(58) Field of Classification Search ................ 71/31–63, 71/64.01, 64.04, 64.03, 64.06, 64.07, 64.11; 266/114–134
See application file for complete search history.

(56) References Cited

U.S. PATENT DOCUMENTS

| 2,926,079 A | 2/1960 | Smith |
| 3,070,435 A | 12/1962 | Reusser et al. |
| 3,092,489 A | 6/1963 | Smith |
| 3,149,956 A | 9/1964 | Seymour et al. |
| 3,227,789 A | 1/1966 | Tytus et al. |
| 3,241,947 A | 3/1966 | Young |
| 3,660,068 A | 5/1972 | Wilson |

FOREIGN PATENT DOCUMENTS

| FR | 1 326 575 A | 5/1963 |
| GB | 800 208 A | 8/1958 |
| GB | 815 829 A | 7/1959 |
| GB | 877 411 A | 9/1961 |
| GB | 2 237 800 A | 5/1991 |
| WO | WO-97/14665 A | 4/1997 |
| WO | WO-01/98233 A1 | 12/2001 |

*Primary Examiner* — Jerry Lorengo
*Assistant Examiner* — Jennifer Smith
(74) *Attorney, Agent, or Firm* — Birch, Stewart, Kolasch & Birch, LLP

(57) ABSTRACT

The invention relates to a fertilizer granule containing ammonium nitrate, comprising a core containing ammonium nitrate and a coating layer containing calcium sulphate. The coating layer consists of a mixture containing calcium sulphate and ammonium nitrate. Such a fertilizer granule is preferably produced by contacting the core with an aqueous ammonium nitrate solution and solid calcium sulphate particles, either as a slurry or separately. The production of the fertilizer granule is safe and easy.

19 Claims, No Drawings

AMMONIUM NITRATE GRANULE AND METHOD FOR THE PREPARATION OF THE SAME

The invention relates to a fertilizer granule containing ammonium nitrate, comprising a core containing ammonium nitrate, and a coating layer containing calcium sulphate. The invention is also directed to the method for producing a fertilizer granule of the said type wherein a core containing ammonium nitrate is provided, followed by coating thereof with a coating layer, and further, to a fertilizer granule produced with such a method.

Particularly in Europe, ammonium nitrate is commonly used as the main nitrogen source in fertilizers. Ammonium nitrate is commercially available either as porous or compact prills, in crystal form, or as granulated granules. Ammonium nitrate fertilizers are applied on the fields either as such, typically containing from 30 to 34.5% by weight of nitrogen, or for instance in the form of calcium ammonium nitrate (granulated with dolomite or calcite), typically containing from 25 to 28% by weight of nitrogen.

Ammonium nitrate is typically produced by neutralizing nitric acid with ammonia. The product thus obtained is mainly used as such or mechanically mixed for producing high-quality nitrogen fertilizers or mixed fertilizers. Nitrogen content higher than 33.5% by weight (the theoretical maximum being 35% by weight) is a general requirement concerning pure ammonium nitrate with commercial significance, in which case it may typically contain about 4% by weight of water and additives for improving the physical properties.

Mechanical properties of ammonium nitrate fertilizers are limited by variation of the volume of this material in a characteristic way for the compound due to changes in crystalline form at different temperatures. Of these variations, irreversible swelling under typical conditions for the application of the compound, at about 32° C., is most problematic, being up to 3.6% in one thermal cycle from 25° C. to 50° C. This problem is even more serious if the temperature rises and falls over said transition point several times. During the use of the fertilizers, swelling causes breakage and erosion of the fertilizer granules, tearing of the bags and exposure of the compound to atmospheric moisture. Swelling also causes safety problems typically requiring repeated cleaning of the working places from dust, and further, even temporary interruptions of the production in the factory. In large scale shipping and extended storage, quality problems may also be brought about by caking of the prilled or granulated product, especially due to hygroscopicity of ammonium nitrate.

Ammonium nitrate is an explosive compound, and accordingly, it is commonly used as an explosive agent for instance in excavation. The explosive nature of ammonium nitrate is based on exothermal decomposition reactions wherein the nitrate ion acts as the oxidizing agent, the ammonium ion being the fuel. Reaction products from this decomposition are gases such as water vapour, nitrogen, and oxygen being able to build extremely high pressures in sufficiently high amounts of ammonium nitrate (>critical mass). In an ammonium nitrate pile, this pressure creates a so-called detonation wave mediating exothermal decomposition reactions throughout the mass.

Several organic compounds such as fuel oil increase the explosive power of ammonium nitrate. Mixed explosives of ammonium nitrate and fuel oil or the like are commonly called ANFO (Ammonium Nitrate Fuel Oil). The highest explosive power of ANFO is theoretically attained with an ammonium nitrate content of 94% by weight and fuel oil content of 6 weight-%. In this case, the fuel (ammonium ion and fuel oil) and the oxidizing agent (nitrate ion) are present in the mixture at a stoichiometric ratio, that is, the oxygen balance of the explosive is nil. In the production of explosive quality ammonium nitrate, a higher porosity than that of fertilizer quality ammonium nitrate is desired. The porosity increases the explosiveness of ammonium nitrate since the air bubbles in the material are strongly expanded at high temperatures corresponding to explosions and this expansion increases the power of the pressure wave. Moreover, in case of ANFO:s, porosity allows the fuel to enter into the structure of the prills or granules, and thus into immediate contact with the ammonium nitrate.

Several accidents associated with ammonium nitrate fertilizer are preceded by contamination caused by organic fuels. Accordingly, there has been accidents. These accidents have been the reason for an increasingly restrictive legislation concerning the distribution of ammonium nitrate. In addition to accidents, several cases of misuse threaten the use of ammonium nitrate as a fertilizer in the future. On several markets, a trend away from pure ammonium nitrate fertilizers and towards inherently safer nitrogen fertilizers based on ammonium nitrate may be seen. Inherent safety requires that the ammonium nitrate fertilizer has been modified in such a way that 1) it will not explode in a pure state, 2) the contamination of ammonium nitrate by organic fuels or the like is prevented, and 3) ammonium nitrate may not easily be separated from the final product.

Already for a long time, there have been attempts to increase the safety of ammonium nitrate fertilizers by diluting with inert non-combustible substances such as sand, calcium carbonate, ammonium phosphate and/or calcium sulphate. The object has thus been to provide a non-combustible and non-explosive mixture typically containing from 70-80% by weight of ammonium nitrate. Typically, the additives are directly added to a melt of ammonium nitrate thus giving substantially homogeneous prills or granules as the final product. For instance U.S. Pat. No. 3,366,468 discloses a fertilizer based on ammonium nitrate containing as additive from 5 to 10% by weight of ammonium phosphate, said publication claiming this fertilizer as being non-explosive. However, in subsequent tests at a larger scale, the product was found to be an explosive substance nearly as powerful as pure ammonium nitrate. In addition, due to homogeneous composition, contamination of the pores by fuel oil or the like cannot be prevented. The document WO/03106377 describes a polymer coating preventing the absorption of hydrocarbons into the pores of ammonium nitrate granules. The amount of energy released in the decomposition reaction of the pure product is, however, not decreased by the coating, but may even be increased due to the organic carbon content of the coating.

In the present patent publication, the disclosed product and the production method thereof are based on the coating of the ammonium nitrate with a coating layer consisting of calcium sulphate. In comparison to homogeneous mixing, the coating offers advantages concerning product safety. Exothermally reacting ammonium nitrate centres may be isolated by the inert coating layer, thus preventing more efficiently the progression of the decomposition reactions for instance in large piles. Moreover, the coating layer consisting of calcium sulphate serves as a barrier between ammonium nitrate and a substance, such as fuel oil, causing sensitizing contamination.

The use of calcium sulphate and various hydrated forms thereof such as the dihydrate (gypsum) as a mixture component or stabilizer is known in the production of ammonium nitrate granules. Gypsum powder has also been used as a coating on the surface of the ammonium nitrate granules, as described in the document WO 97/14665. Due to the amount of water necessary for successful granulation, and to the hygroscopicity of the gypsum powder used for coating, the resistance of the finished granules to extended storage is poor in said method. Also the document U.S. Pat. No. 4,026,696 is directed to coating of nitrogen fertilizers, either urea, ammonium nitrate or mixtures of the two, with calcium sulphate. Addition of free water is not included in the method, but the method is rather based on high temperatures causing urea or ammonium nitrate to react with calcium sulphate to give encapsulated prills. The reaction between urea and calcium sulphate is well known, but in case of ammonium nitrate, higher temperatures are needed, preferably at least 113° C. for the whole mixture. In large scale, this process requires high amounts of energy, and in addition, agglomeration easily becomes a problem since the surface of the ammonium nitrate prill must be partly melted to provide the claimed reaction.

In the previous patent FI 113366 of the applicant, ammonium nitrate was coated with calcium sulphate-hemihydrate, and an adhesive agent, preferably urea-formaldehyde, sprayed on ammonium nitrate cores to be coated was used as an adjuvant in the process. This urea-formaldehyde increases the production costs, and moreover, the handling thereof causes problems for instance due to limited storage life. For this reason, it is preferable to develop the production process to allow the production of safe ammonium nitrate fertilizers coated with calcium sulphate and having high mechanical quality, without using an adhesive adjuvant.

Accordingly, the object of the invention is to provide a safe fertilizer based on ammonium nitrate having a high nitrogen content, the safety of said fertilizer being sufficient for various storage, keeping and application conditions, and further, said fertilizer being mechanically sufficiently stable and user-friendly. At the same time, an easy as possible production process is aimed at. These objects are now achieved with a novel fertilizer granule containing ammonium nitrate, comprising a core containing ammonium nitrate, and a coating layer containing calcium sulphate. This novel fertilizer granule is characterized in that said coating layer consists of a mixture containing calcium sulphate and ammonium nitrate. It is thus found that said mixed coating is firmly attached and will not break. Safe fertilizer granules with uniform sizes are obtained.

The total nitrogen content of the claimed fertilizer granule is typically at least 27% by weight. The ammonium nitrate content of the core is preferably at least 80% by weight, most preferably at least 94% by weight. Ammonium nitrate produced with commonly known processes is used as the fertilizer core, the core being preferably a porous or compact prill or a granulated granule. Ammonium nitrate cores may be stabilized prior to coating in a manner described for instance in the application WO 0 149 608 (such as with $Al_2(SO_4)_3$). The fertilizer core is substantially ammonium nitrate possibly containing very low amounts of other compounds found useful in the production. It is desirable to maintain the nitrogen content of the fertilizer core as high as possible, preferably higher than 33% by weight. If necessary, the fertilizer core may also contain other trace elements not, however, catalyzing decomposition reactions of ammonium nitrate. Depending on the production method, the mass ratio of the core to the coating layer ranges between 40:60 and 80:20. This ratio is preferably about 45:55 or about 75:25.

Calcium sulphate in the coating layer is preferably anhydrite, hemihydrate or in situ formed dihydrate (gypsum). The weight ratio of ammonium nitrate to calcium sulphate in the mixture of the coating layer of the fertilizer granule is typically between 0.1:1 to 1.5:1. The water content in the coating mixture, and preferably in the whole granule is preferably less than 2%, more preferably less than 1% by weight.

According to a preferable embodiment of the invention, the coating layer of the fertilizer granule is in direct contact with the core. In fact it has been found that no adhesive agent mentioned in the patent FI 113366 is needed between the core and the coating layer if the coating layer contains a mixture of ammonium nitrate and calcium sulphate, as disclosed in the invention. Preferably, said mixture is substantially homogeneous. It is however possible to provide a calcium sulphate content increasing radially for instance by alternately contacting the granule with aqueous ammonium nitrate solutions, the concentration of which is gradually lowered, and with calcium sulphate powder.

According to one embodiment of the invention, the granule comprises a second coating layer outside said coating layer. The second coating layer may for instance contain a mixture of ammonium nitrate and calcium sulphate at the same or different ratio. It may also be an anti-caking agent, such as an oil amine.

As previously mentioned, the invention is also directed to a method for producing a fertilizer granule described above, wherein a core containing ammonium nitrate is coated with a coating layer. The method is characterized in that a coating layer is formed from a mixture of calcium sulphate and ammonium nitrate.

The core containing ammonium nitrate may either be a prill or a granule. It is preferable to form the coating layer by contacting the core with an aqueous ammonium nitrate solution and with calcium sulphate particles. In this case, the method of the invention has two main embodiments.

According to the first main embodiment (prill fattening), the core containing ammonium nitrate is wetted with a slurry containing calcium sulphate, ammonium nitrate and water, followed by drying of the wetted core and then coating it with a coating layer. Wetting is preferably carried out by introducing the core into a granulator (such as a plate or drum granulator), followed by feeding a slurry containing calcium sulphate, ammonium nitrate and water thereon. The outermost coating layer is typically made of an anti-caking agent such as an oil amine.

When wetting with the slurry containing calcium sulphate, ammonium nitrate and water, the core containing ammonium nitrate is typically warm, preferably at a temperature of 80-100° C. It is desirable that the slurry contains from 40 to 60% by weight of calcium sulphate, from 40 to 60% by weight of ammonium nitrate and from 5 to 10% by weight of water. The slurry is preferably made by mixing solid calcium sulphate into an aqueous ammonium nitrate solution. It is also preferable that the calcium sulphate used is in the anhydrite form.

When feeding the slurry containing calcium sulphate, ammonium nitrate and water onto the core containing ammonium nitrate, the temperature thereof is preferably from 110 to 130° C. The drying of the wetted core in ordorte coat it with a coating layer is preferably carried out at a temperature ranging from 80 to 150° C. Most preferably, a temperature giving a moisture content of the coating layer of less than 2% by weight is used.

After drying, screening to a desired particle size may be carried out. The process may also be performed by recycling the treating slurry and/or core/cores, thus obtaining a continuous process and post processing of the outer surface of the core.

According to the second main embodiment, the coating is separately performed with the ammonium nitrate solution and the calcium sulphate. Thus, the core containing ammonium nitrate is wetted with the aqueous ammonium nitrate solution and contacted with separately fed solid calcium sulphate particles (not as a slurry), followed by drying of the core that has been wetted and contacted with calcium sulphate to give the final product or a product to be coated with another coating layer such as with an oil amine.

Typically, the core containing ammonium nitrate is first wetted with aqueous ammonium nitrate solution only (initial wetting), followed by contacting with distinct solid calcium sulphate particles while wetting with said aqueous solution is continued. These operations are preferably carried out by introducing the core into a mixer, spraying (for instance by nebulizing) said solution on the core and finally by feeding distinct solid calcium sulphate particles into contact with the core. Finally, only wetting with the aqueous ammonium nitrate solution is performed prior to drying (final wetting).

In this main embodiment, when wetting with aqueous ammonium nitrate solution and contacted with distinct solid calcium sulphate particles, the core containing ammonium nitrate is typically warm, preferably at a temperature ranging from 40 to 80° C. The composition of the aqueous ammonium nitrate solution is preferably from 50 to 80% by weight of ammonium nitrate, and from 20 to 50% by weight of water. The temperature of the solution ranges typically from 35 to 80° C., preferably from 55 to 75° C. The total duration of the contacting typically ranges from 10 to 60 minutes, preferably from 20 to 40 minutes.

Said distinct solid calcium sulphate particles are preferably in the hemihydrate form. Distinct solid calcium sulphate particles may thus be reacted with the water of the aqueous ammonium nitrate solution on the core containing ammonium nitrate to produce calcium sulphate dihydrate endowing the product with particularly superior physical properties, especially hardness and abrasion resistance. The reaction is typically performed by mixing the cores coated with the aqueous ammonium nitrate solution and calcium sulphate particles for some time, such as for 3-10 minutes, after the addition.

High temperatures are eventually not necessary, but the wetted and contacted core may be dried at room temperature, thus preferably obtaining a moisture content of less than 2% by weight. After drying, a screening to a desired particle size may be performed.

Finally, the invention is directed to a fertilizer granule produced with the method described above. The granule produced according to the first main embodiment has a coating layer preferably containing 60% by weight of ammonium nitrate and 40% by weight of calcium sulphate, calculated as anhydrite. The granule produced according to the second main embodiment has a coating layer preferably containing from 8 to 28% by weight of ammonium nitrate and from 72 to 92% by weight of calcium sulphate, calculated as anhydrite.

The product preferably has the following properties. Typically, it contains from 10 to 15% by weight of ammonium and nitrate nitrogen, and preferably less than 2% by weight of water. Caking properties of the product are such that a pressure of 1 mg/cm$^2$ applied to a sample bag of 100 g for 24 hours produces a cake comprising less than 20% of the total sample mass. In addition, the product produces dust less than 100 mg/kg, the strength thereof being at least 25 N. A typical particle size of the product (diameter) is from 2.4 to 4.0 mm.

Compared to adding, for instance by homogeneous agitation, of a mixture of calcium sulphate and ammonium nitrate to the fertilizer core itself, it was found that coating with said mixture was a more effective way to improve the safety of a product based on ammonium nitrate. A coating layer having a high calcium sulphate content increases the safety of the product by acting as an insulating intermediate layer against temperature surges and sensitizing contaminations, while however allowing for a high nitrogen content in the whole product. With detonation tests, it was demonstrated that a product containing less than 27% by weight of nitrogen will not detonate. The detonation test was performed according to the EU Directive 80/876/EEC, in a 1 meter steel pipe using a 500 g PETN initiation. In this so-called EU test, the steel pipe is filled with the fertilizer sample, the pipe is horizontally placed on six lead cylinders having a height of 100 mm and a pressure wave is created in the sample by means of the initiation at one end of the pipe, the other end being closed with a steel bottom plate. The sample is considered to pass the test, if the compression of at least one lead cylinder is less than 5%. In the test series now performed, the EU detonation test was modified to be still more stringent by mixing 24 hours prior to testing diesel oil to the fertilizer sample in an amount of 6% by weight while continuously agitating the sample. In this manner, the sample was made as sensitive to detonation as possible. The results obtained from the test are shown in Table 1, in comparison to pure ammonium nitrate prill.

TABLE 1

Detonation test results for AN prill absorbed with oil and for the product of the invention, coated with a mixture of calcium sulphate and ammonium nitrate (first embodiment, or prill fattening)

| | Compression of the lead cylinder | | | | | | Remaining pipe (cm) |
|---|---|---|---|---|---|---|---|
| | 1 | 2 | 3 | 4 | 5 | 6 | |
| AN prill | 37 | 38 | 37 | 38 | 33 | 17 | |
| Coated product of the invention | 37 | 14 | 0 | 0 | 0 | | 1 |

The results presented in Table 1 clearly show the protective effect of the coating against the transmission of the detonation wave. In fact, the product clearly passes the EU criterion even when sensitized with diesel oil: only two cylinders out of six show a compression higher than 5%.

The invention is now illustrated with the following embodiment examples.

EXAMPLE 1

First Main Embodiment

Prill Fattening

Commercial ammonium nitrate prills ($d_{50}$=2.4 mm) were coated according to the first main embodiment (prill fattening) with a slurry formed from ammonium nitrate and calcium sulphate in anhydrite form, said slurry consisting of said starting materials at a mass ratio of AN:CaSO$_4$=60:40, and about 8% by weight of water. 56% by weight of the slurry, and 44% by weight of the prills were used for the final product, corresponding to a nitrogen content of 27% by weight in the final product.

As the coating apparatus, a plate granulator having a diameter of 1.0 m was used. The test was continuously run by recycling the prills through the heated drum serving in the test as the preheater of the prills added as a fresh feedstock and as the drying drum of the coated prills. The temperature of the prills thus heated was about 90° C., this temperature being preferable for the adhesion of the coating matter. The slurry was pumped from the mixing tank reactor at 110-120° C. and sprayed on the prills on the plates as finely divided droplets formed by means of external nebulization using pressurized air. Nitrogen analyses of the product stream were carried out, and on the basis of these analyses, the material was recirculated back to the plate granulator until the desired nitrogen level of 27% by weight was reached. The typical size distribution of the test run was as follows:

d>4 mm: 19.9 kg
2.4 mm<d<4.0 mm: 190 kg (=product fraction)
d<2.4 mm: 19.6 kg.

Fractions having too large and too small sizes could be easily reused in the production of the slurry, and thus high amounts of waste were not produced in the test run. The final product was finally coated with an oil amine as a batch operation, aiming at reducing the caking of the product. Chemical analyses of the final product gave the following results:

$H_2O$ by Karl Fisher titration: 0.60% by weight
$NO_3$—N: 13.4% by weight
$NH_4$—N: 13.4% by weight
$SO_3$: 14.7% by weight Based on the x-ray diffraction analysis, all of the calcium sulphate was present as anhydrite, that is, the adhesion of the coating was not based on chemical reactions between ammonium nitrate and calcium sulphate. Some quality properties of the product are presented in Table 2. The improved quality properties, particularly strength and abrasion resistance compared to those of ammonium nitrate prill may be clearly seen from the Table.

EXAMPLE 2

Second Main Embodiment

Dry Hemihydrate

Commercial ammonium nitrate prills ($D_{50}$=2.4 mm) were coated according to the second main embodiment (dry hemihydrate) with aqueous ammonium nitrate solution and calcium sulphate in hemihydrate form. The aqueous ammonium nitrate solution used consisted of 70% by weight of ammonium nitrate and 30% by weight of water. 15.6 kg of the prills, 4.0 kg of calcium sulphate hemihydrate ($CaSO_4 \cdot \frac{1}{2}H_2O$), and 2.0 kg of aqueous ammonium nitrate solution were used for the final product, corresponding to a nitrogen content of 28% by weight in the final product.

The coating test was carried out in a concrete mixer using a batch of 20 kg. Prior to starting the test, the ammonium nitrate prills were preheated in an oven approximately to 60° C., this temperature being a preferable temperature for the adhesion of the coating. Aqueous ammonium nitrate solution was pumped at about 63° C. (crystallization temperature of the solution is about 35° C.) from a beaker and sprayed on the prills as a mist formed by internal nebulization by means of pressurized air. The prills were initially wetted with about 150 g of the solution, followed by the simultaneous addition of calcium sulphate hemihydrate. Once the addition of calcium sulphate hemihydrate was completed, spraying of the aqueous ammonium nitrate solution was continued for 100 g of the solution, and the batch was allowed to rotate in the mixer for 5 minutes. The total duration of the addition was 29 minutes (+5 minutes of mixing). Immediately following the test, the moisture content in the batch is 2.7% by weight, as determined by Karl Fisher titration. The product was allowed to dry in the room atmosphere, and after two nights, the moisture content was reduced to 1.8% by weight.

On the basis of chemical analyses, the total nitrogen content of the product was about 28% by weight. Due to the low ammonium nitrate content of the coating layer, it was not necessary to coat the product with an anti-caking agent. Based on the x-ray diffraction analysis, a significant proportion (about one third) of the calcium sulphate had reacted with the water present in the aqueous ammonium nitrate solution to give the dihydrate form from the hemihydrate form. The tests have shown that this reaction is necessary to obtain a superior physical quality, particularly to avoid dust formation and to obtain a high abrasion resistance. Some quality properties of the product are presented in Table 2. Improved quality properties, particularly strength and abrasion resistance, in comparison to those of ammonium nitrate prill, may be clearly seen from the Table.

EXAMPLE 3

Product Composition and Properties

TABLE 2

Quality properties of the coated products. Sample 1 = a product produced according to the first main embodiment (Example 1). Sample 2 = a product produced according to the second main embodiment (Example 2). AN prill = uncoated AN prill.

|  | Sample 1 | Sample 2 | AN prill |
|---|---|---|---|
| Abrasion, %[1] | 1.4 | 15 | 55 |
| Caking 1) Without pretreatment |  |  |  |
| Caking, % | 4.3 | 0.1 | 0.0 |
| $H_2O$ (oven), % | 0.5 | 1.9 | 0.2 |
| 2) Pretreatment: rel. hum. 75%, 25° C., 2 h |  |  |  |
| Caking, % | 50 | 13 | 34 |
| $H_2O$ (oven), % | 1.3 | 2.6 | 0.5 |
| Dust, mg/kg | <100 | <100 | <100 |
| Mean hardness, N | 28 | 32 | 14 |

[1]Proportion of the sample that disintegrates while rotating the sample in a drum in the presence of steel spheres.

The invention claimed is:

1. Process for the preparation of a fertilizer granule having a nitrogen content of at least 27% by weight, comprising:
    providing an aqueous solution of ammonium nitrate and particles of calcium sulphate, and
    contacting a core containing at least 80% by weight of ammonium nitrate with said aqueous solution of ammonium nitrate and particles of calcium sulphate to give a coating layer on the core consisting of an essentially homogeneous mixture containing calcium sulphate and ammonium nitrate.

2. Process according to claim 1, characterized in that the core containing ammonium nitrate is wetted with a slurry containing calcium sulphate, ammonium nitrate and water, after which the wetted core is dried to coat it with the coating layer.

3. Process according to claim 2, characterized in that the core containing ammonium nitrate is wetted with the slurry containing calcium sulphate, ammonium nitrate and water by bringing the core on a granulator and feeding upon the core the slurry containing calcium sulphate, ammonium nitrate and water.

4. Process according to claim 2, characterized in that the core containing ammonium nitrate is warm, preferably at a temperature of between 80 and 100° C., when it is wetted with the slurry containing calcium sulphate, ammonium nitrate and water.

5. Process according to claim 2, characterized in that the slurry containing calcium sulphate, ammonium nitrate and water contains 40-60% by weight of calcium sulphate, 40-60% by weight of ammonium nitrate and 5-10% by weight of water.

6. Process according to claim 2, characterized in that the slurry containing calcium sulphate, ammonium nitrate and water is formed by mixing solid calcium sulphate with an aqueous solution of the ammonium nitrate.

7. Process according to claim 2, characterized in that the calcium sulphate is in the anhydrite form.

8. Process according to claim 2, characterized in that the slurry containing calcium sulphate, ammonium nitrate and water is fed onto the core containing ammonium nitrate at a temperature of 110-130° C.

9. Process according to claim 2, characterized in that the wetted core is dried at a temperature of 80-150° C. to coat it with the coating layer, preferably to a moisture of below 2% by weight.

10. Process according to claim 1, characterized in that the core containing ammonium nitrate is wetted with an aqueous solution of ammonium nitrate and is separately contacted with solid calcium sulphate particles, after which the wetted and contacted core is dried to coat it with the coating layer.

11. Process according to claim 10, characterized in that the core containing ammonium nitrate is first separately subjected to an initial wetting with the aqueous solution of ammonium nitrate and then contacted with the solid sulphate particles as the wetting with an aqueous solution of ammonium nitrate is continued.

12. Process according to claim 11, characterized in that after the core has been contacted with the solid calcium sulphate particles, it is subjected to a separate final wetting only with an aqueous ammonium nitrate solution.

13. Process according to claim 10, characterized in that the core containing ammonium nitrate is wetted with the aqueous solution of ammonium nitrate and contacted with the distinct solid calcium sulphate particles by bringing the core to a mixer, spraying said solution on the core and feeding the solid calcium sulphate particles into contact with the core.

14. Process according to claim 10, characterized in that the core containing ammonium nitrate is warm, preferably at a temperature of 40-80° C., when it is wetted with the aqueous ammonium nitrate solution and contacted with the solid calcium sulphate particles.

15. Process according to claim 10, characterized in that the aqueous solution of ammonium nitrate contains 60-80% by weight of ammonium nitrate.

16. Process according to claim 10, characterized in that the temperature of the aqueous solution of ammonium nitrate is 35-100° C., preferably 55-75° C.

17. Process according to claim 10, characterized in that the solid calcium sulphate particles are constituted of the hemihydrate of calcium sulphate.

18. Process according to claim 17, characterized in that the solid calcium sulphate hemihydrate particles are on the surface of the core containing ammonium nitrate reacted with the water of the aqueous ammonium nitrate solution so that dihydrate of the calcium sulphate is formed.

19. Process according to claim 10, characterized in that the wetted and contacted core is dried at room temperature to coat it with the coating layer, preferably to a moisture of below 2% by weight.

* * * * *